(12) United States Patent
Dubruque et al.

(10) Patent No.: US 7,101,485 B2
(45) Date of Patent: Sep. 5, 2006

(54) LIQUID PROCESS AND CONTINUOUS FILTERING DEVICE USING HIGH POWER DENSITY ULTRASOUNDS

(75) Inventors: Dominique Dubruque, Vimines (FR); Philippe Vaxelaire, Aix les Bains (FR); Pierre Devidal, Bourdeau (FR); Gilles Boursier, Saint Foy les Lyon (FR)

(73) Assignee: Sodeva, Le Bourget (FR)

( * ) Notice: Subject to any disclaimer, the term of this patent is extended or adjusted under 35 U.S.C. 154(b) by 39 days.

(21) Appl. No.: 10/472,024

(22) PCT Filed: Mar. 13, 2002

(86) PCT No.: PCT/FR02/00889

§ 371 (c)(1),
(2), (4) Date: Feb. 17, 2004

(87) PCT Pub. No.: WO02/072229

PCT Pub. Date: Sep. 19, 2002

(65) Prior Publication Data

US 2004/0129643 A1  Jul. 8, 2004

(30) Foreign Application Priority Data

Mar. 13, 2001  (FR)  .................... 01 03387
Jun. 1, 2001  (FR)  .................... 01 07282

(51) Int. Cl.
*C02F 1/36* (2006.01)
(52) U.S. Cl. .............. 210/748; 210/407; 210/439; 210/446; 310/334
(58) Field of Classification Search ............... 210/748, 210/407, 439, 446; 310/344
See application file for complete search history.

(56) References Cited

U.S. PATENT DOCUMENTS 5,384,508 A    1/1995  Vaxelaire
6,787,046 B1 *  9/2004  De Kock et al. ........... 210/748

FOREIGN PATENT DOCUMENTS

| DE | 38 11 706 A1 | 10/1989 |
| EP | 0 904 820 A1 | 3/1999 |
| FR | 2 743 929 A1 | 7/1997 |
| FR | 2 769 516 A1 | 4/1999 |
| JP | 08 141325 | 6/1996 |
| WO | WO 94 21361 | 9/1994 |

* cited by examiner

*Primary Examiner*—Betsey Morrison Hoey
(74) *Attorney, Agent, or Firm*—Blakely Sokoloff Taylor & Zafman

(57) ABSTRACT

The present invention relates to a continuous filtration device in a liquid path, characterized in that it comprises, in combination:

Figure 1:
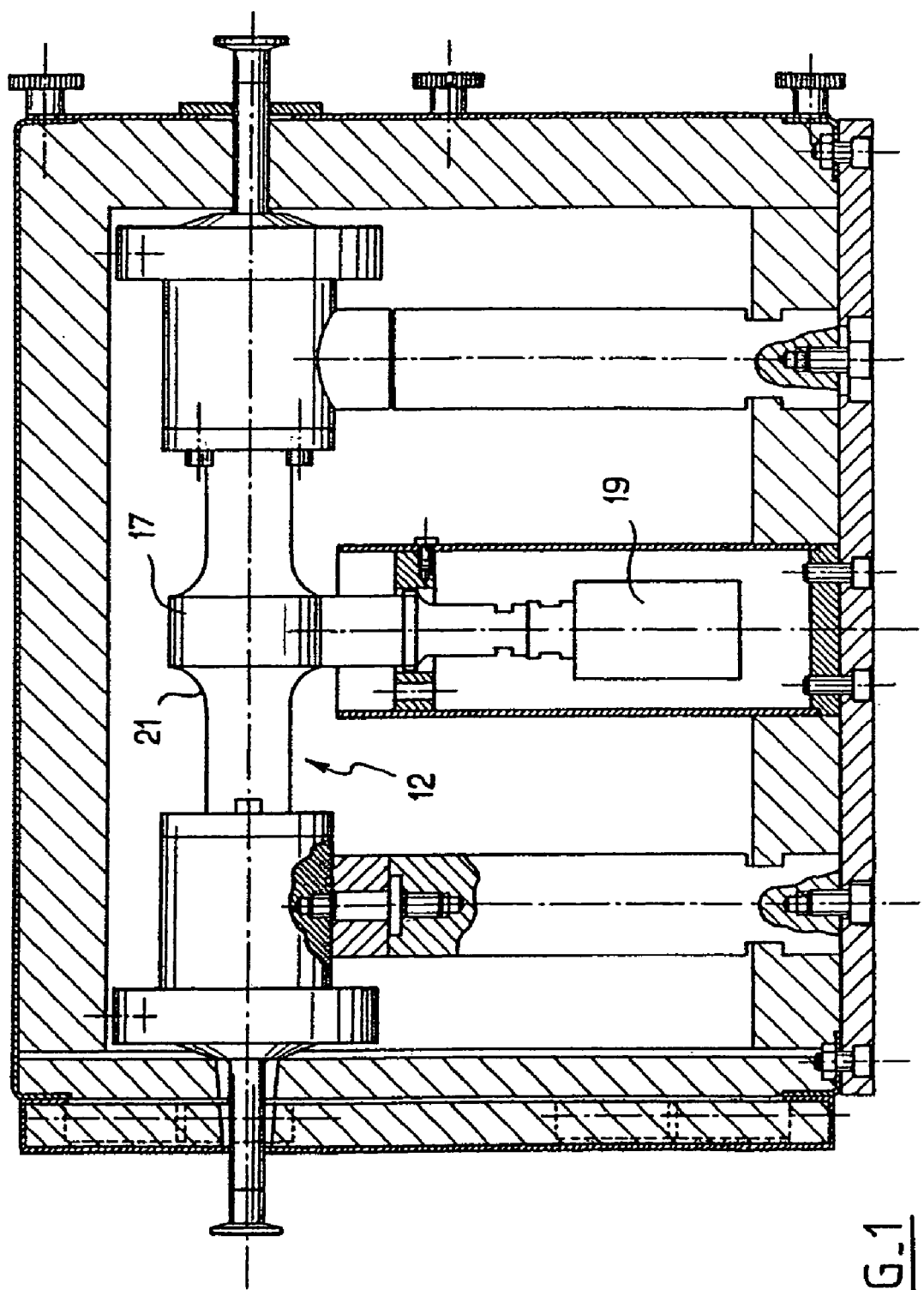

a modular ultrasonic treatment unit (12) which is in the form of a tubular metal body (11) with a cylindrical internal surface (13) and of circular cross section, open at both its feed end (10) and its discharge end (15), the external surface of the said tubular metal body having, in the vicinity of the nodal zone, a collar (17) which is coaxial with the said tube and which projects radially, this collar being equipped at its periphery with an ultrasonic converter (19) which projects radially and whose frequency is equal to the vibration frequency of the said collar (17) and to the longitudinal vibration frequency of the said tubular metal body (11), and a filtering cylindrical element (14) having a minimum filtration area of about 50 cm$^2$ and preferably about 80 cm$^2$ with a mesh opening less than about 20 µm, which is arranged inside the tubular metal body (11) and coaxially with the latter between its feed end (10) and discharge end (15), the nominal ultrasonic power density dissipated inside the tubular metal body being greater than about 2 watts per cm$^2$ of filtering area.

12 Claims, 3 Drawing Sheets

FIG_1

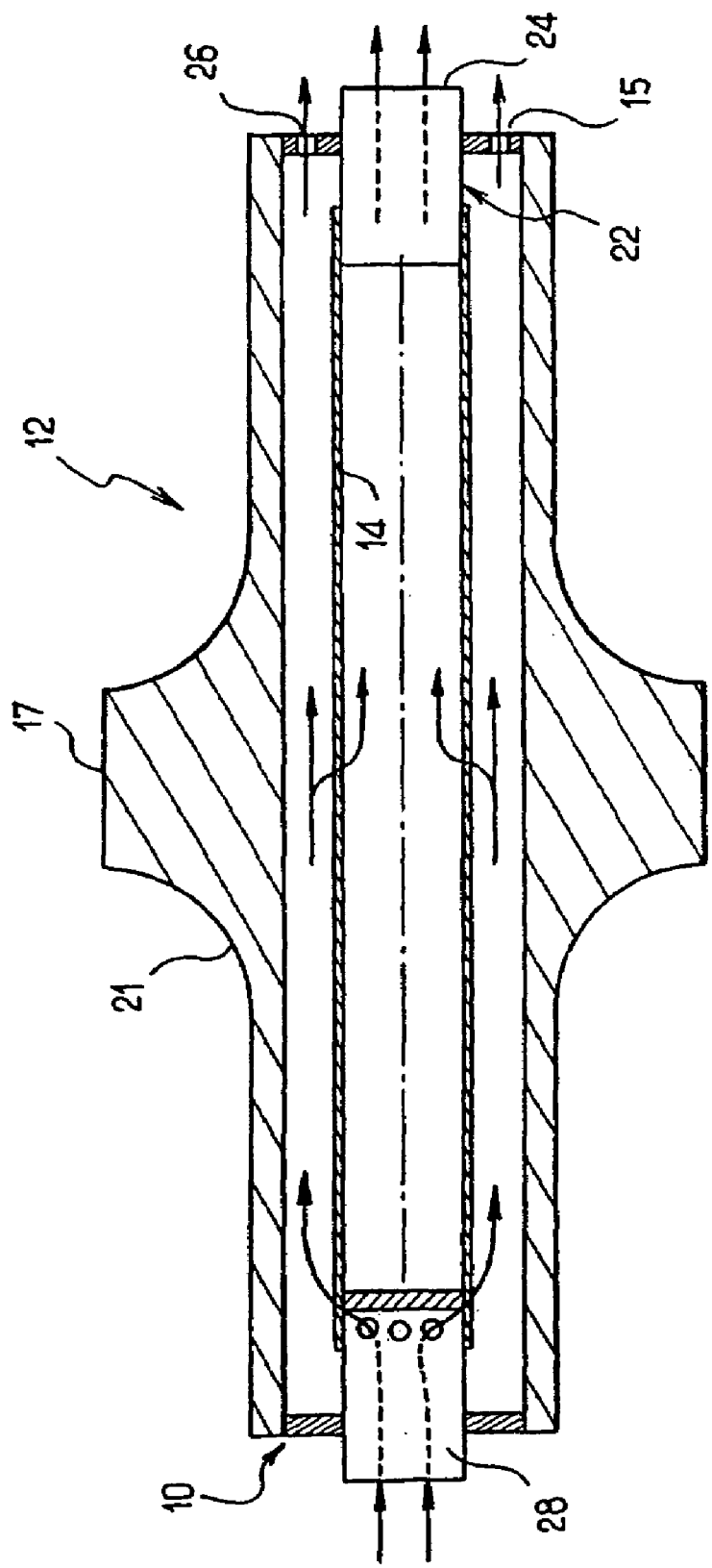
FIG_3

LIQUID PROCESS AND CONTINUOUS FILTERING DEVICE USING HIGH POWER DENSITY ULTRASOUNDS

The present patent application is a non-provisional application of International Application No. PCT/FR02/00889, filed Mar. 13, 2002.

The present invention relates to a continuous filtration device in a liquid path using high-power-density ultrasound.

More particularly, the present invention relates to a continuous filtration device in a liquid path using a tubular modular ultrasonic treatment unit acting both as an external jacket for a cylindrical filtering element and as a source of high-power-density ultrasound.

Such a modular treatment unit is described in a detailed manner in French Patent FR 2 671 737 and in the corresponding European Patent EP 0 567 579.

In the field of filtration in a liquid path, a certain number of devices are already known comprising, inside a filtration vessel through which a liquid flows, filtering elements through which the liquid passes and which retain the particles to be filtered.

Also known are devices for cleaning and regenerating filtering elements by periodic application of a counter-current of liquid, possibly simultaneously with applying ultrasonic vibration within the said filtration vessel. This vibration may be created by an ultrasonic vibration source attached to the said vessel, or else immersed inside the said vessel, close to the filtering elements.

The cleaning effect obtained by virtue of the ultrasonic vibration is due to the physical phenomenon of cavitation in liquids, well known to a person skilled in the art.

Filtration devices are also known in which ultrasonic vibration is continuously applied during the filtration process, assisting the filtration.

For example, it is possible to force the passage of particles with a size less than the opening of the mesh or of the pores of the said filtering elements with the aid of a straight cylindrical sonotrode such as those commonly used in the laboratory, provided that the end of the sonotrode is sufficiently close to the said elements so that the amplitude of the vibration obtained in the liquid in contact with the said filtering element is large enough.

Such a device remains limited to laboratory applications, or to very low flow rates, and therefore does not lend itself to in-line use in a manufacturing process, because of the geometry of the sonotrode whose useful vibrating surface is necessarily too small.

Devices are also known where ultrasonic vibration is continuously applied to a chamber in which the filtering elements are situated, but which is not acoustically tuned to the elements for creating and/or propagating the said vibrations.

Such devices are limited in the useful acoustic power which can be transmitted to the filtering elements and do not allow a uniform distribution of this power to be obtained over the filtering elements.

There are other sources of ultrasonic vibrations which can be immersed in liquids, such as dip-tubes. The latter have a large useful vibrating surface. However, they generate a cavitation power density which is limited and often insufficient (less than 1 W/cm$^2$ of filtering surface) to substantially improve a filtration process.

Furthermore, since in this case the filtering element can only be placed outside the ultrasound tubes, the plant has the drawback of necessarily having to be bulky and of necessitating the use of large-diameter filters and an external tubular jacket.

At present, there is therefore no filtering device in a liquid path satisfying the following various constraints:
- continuously using ultrasonic vibration to improve the filtration process;
- obtaining a uniform distribution of the ultrasonic cavitation power over the entire filtering surface;
- obtaining, in contact with the surface, a mean ultrasonic power density much greater than 2 watts per cm$^2$ of filtering surface;
- being compact;
- being suitable for industrial use.

The aim of the present invention is specifically to satisfy all the above criteria.

According to the present invention, the filtration device comprises a modular ultrasonic treatment unit which is in the form of:
- a tubular metal body with a cylindrical internal surface and of circular cross section, open at both its feed end and its discharge end, the external surface of the said tubular metal body having, in the vicinity of the nodal zone, a collar which is coaxial with the said tube and which projects radially, this collar being equipped at its periphery with an ultrasonic converter which projects radially and whose frequency is equal to the vibration frequency of the said collar and to the longitudinal vibration frequency of the said tubular metal body, and
- a filtering cylindrical element having a minimum filtration area of about 50 cm$^2$ and preferably about 80 cm$^2$ with a mesh opening less than about 20 µm, which is arranged inside the tubular metal body and coaxially with the latter between its feed end and discharge end, the nominal ultrasonic power density dissipated inside the tubular metal body being greater than about 2 watts per cm$^2$ of filtering area.

According to another feature of the invention, the length of the tubular metal body is equal to a whole number of half wavelengths of the ultrasonic vibration frequency delivered by the converter, the internal and external diameters of the collar being determined so that the vibration frequency of the said collar is at the same ultrasonic vibration frequency as that delivered by the converter.

According to another feature of the present invention, the filtering cylindrical element is chosen from woven or nonwoven metal filters mounted on a metal support, woven or nonwoven synthetic filters mounted on a metal support, sintered multilayer metal filters and self-supporting sintered metal or mineral filters.

According to a particular feature of the invention, the filtering cylindrical element is connected to the tubular metal body by connecting parts designed such that the liquid to be filtered passes, either from the outside of the filtering element towards the inside thereof, or, conversely, from the inside of the filtering element towards the outside thereof.

According to a particular embodiment of the invention, the filtration device may be integrated into a circuit carrying a liquid to be filtered, making it possible to measure the pressure difference between the inlet and the outlet of the device and to control this pressure difference by adjusting the flow rate of liquid in the circuit and/or the pressure drop downstream of the said device.

According to another variant of the invention, the connecting parts between the tubular metal body and the filtering cylindrical element together with the circuit carrying the fluid to be treated are designed such that the filtration is carried out according to a tangential filtration principle.

In general, the filtration device according to the invention may be integrated into a circuit carrying a liquid to be filtered, making it possible to carry out periodic counter-current cleaning of the filtering element, as soon as the pressure difference between the inlet and the outlet of the said filtering element exceeds a predetermined threshold value.

The invention also relates to a method of using a filtration device as described above, according to which the intensity of cavitation in the liquid to be filtered can be adjusted by controlling the power of the ultrasonic vibration and/or by the choice of the shape of a booster interposed between the ultrasonic transducer and the external surface of the said collar which projects radially in the vicinity of the nodal zone of the said tubular metal body.

Finally, the present invention allows the construction of an ultrasonic filter made by coupling, in series or in parallel, a plurality of modular ultrasonic treatment units as described above containing a coaxial filtering cylindrical element, thus creating an in-line multi-filter device. Such an ultrasonic filter may comprise several converters powered in parallel by the same generator.

The present invention will be described hereinbelow in more detail with reference to two particular embodiments illustrated by the appended figures in which FIGS. 1 and 2 correspond to a first embodiment of the simple filtration device and FIG. 3 corresponds to an embodiment for tangential filtration. In these figures and in the rest of the description, corresponding elements are denoted by the same references.

Figure 2:
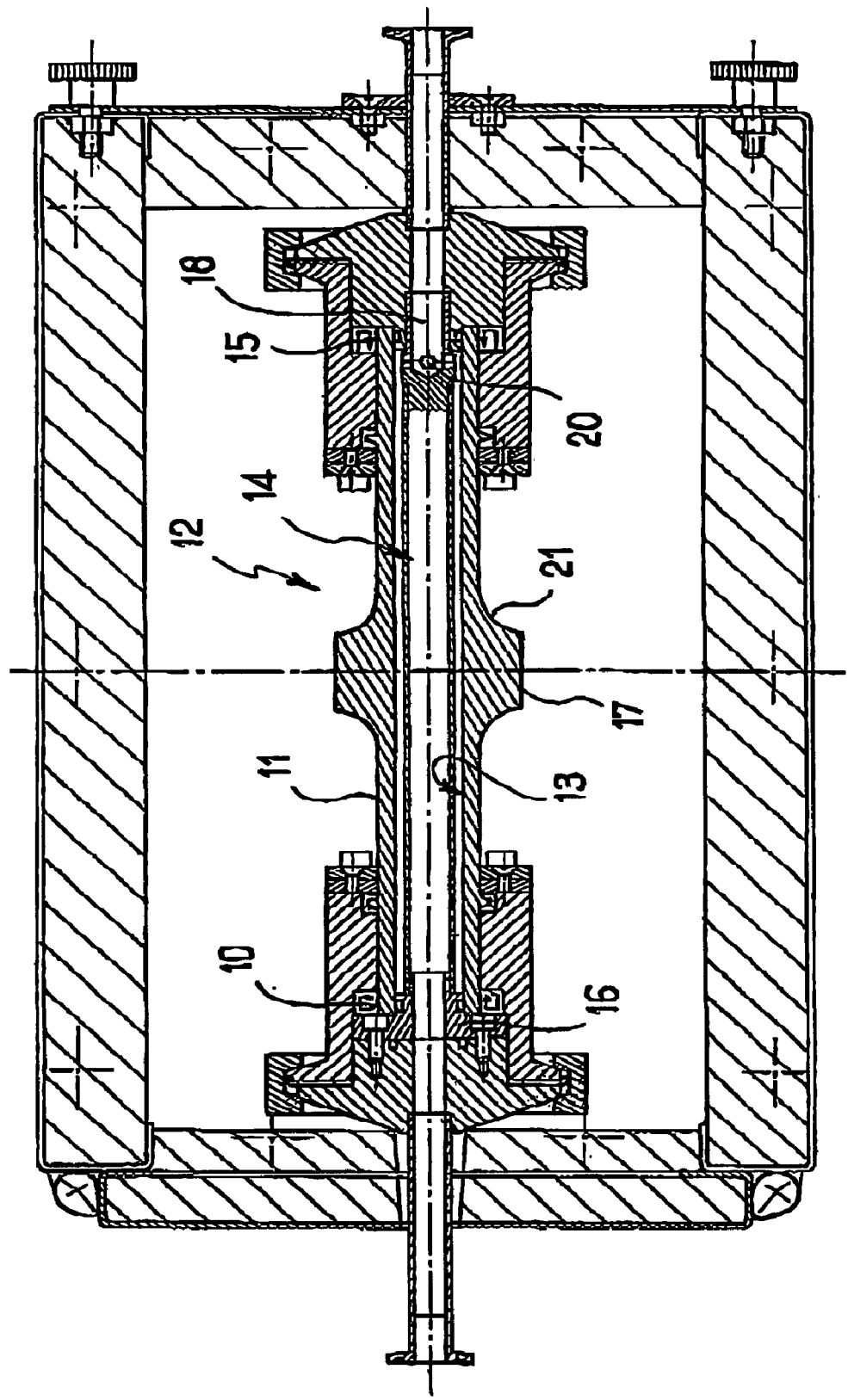

As shown in FIGS. 1 to 3, the modular reactor unit 12 mainly consists of three essential characteristic elements. First of all, the unit 12 comprises a tubular metal body 11 having an internal cylindrical surface 13 of circular cross section. The tubular metal body 11 is open at its two ends, that is to say at its feed end 10 and at its discharge end 15. These two feed and discharge ends 10, 15 will be coupled to feed and discharge pipes, themselves possibly fitted with circulation pumps. This part of the plant is not shown given that it calls on entirely conventional components well known to a person skilled in the art.

The modular unit 12 also comprises, on the outer surface of the tubular metal body 11, in the vicinity of the nodal zone of the latter, a collar 17 which is coaxial with the said tube, the said collar projecting radially outwards from the free surface of the tubular body 11.

Finally, the modular unit 12 comprises at least one ultrasonic converter 19 which is arranged radially and in such a way as to be integral with the said collar 17 at the periphery thereof. The frequency of the said converter 19 is equal to the vibration frequency of the said collar 17 and to the longitudinal vibration frequency of the tubular metal body 11.

In practice, a conventional converter, for example of the type with piezoelectric excitation, is used for example for the ultrasonic converter 19. It may for example be of the "Langevin Triplet" type, as is described in the work High Intensity Ultrasonics by B. Brown and J. E. Goodman.

According to the particular embodiment shown in FIGS. 1 to 3, the coaxial collar 17 is machined directly from the tubular metal body 11. In this type of embodiment, the collar 17 is connected to the external surface of the tubular body 11 via connection fillets 21. The tubular metal body 11 has, according to the embodiment described, a length equal to a half wavelength for the frequency that it is desired to use. It should be noted in this respect that the frequency of the ultrasonic vibration delivered by the emitter or converter 19 will also be between 5 and 100 kHz. In this particular embodiment, the length of the tubular metal body is exactly equal to a half wavelength of the frequency of the ultrasonic vibration. However, it is perfectly possible, within the scope of the present invention, to use a tubular metal part of larger size, which is extended, for example, on one or both sides of the axial collar 17 by a length equal to a whole number of half wavelengths of the delivered frequency, it being possible for the bond between this metal part and the modular unit to be produced, for example, at the longitudinal amplitude antinodes (stress nodes) by means of screw threads, force fittings, welds or the like or even be machined from the solid.

In a particularly advantageous embodiment, the modular ultrasonic treatment unit 12 could be a SONITUBE 20 or 35 kHz marketed by Sodeva.

In the simple filtration assembly illustrated in FIGS. 1 and 2, a pump (not shown) pumps the liquid to be filtered into one of the ends of the modular ultrasonic reactor 12. The liquid to be filtered therefore enters the filtering element 14 via the part 16 or 18. If the inlet part is the part 16, the liquid is filtered by the filtering element 14 from the inside towards the outside, before emerging through the holes 20 formed in the part 18.

The pressure gradient inside the device may be controlled by adjusting the flow rate of the pump (not shown), located upstream of the device and/or by adjusting the opening of a valve located downstream of the device. Pressure measuring gauges, located upstream and downstream of the device, may advantageously complete the device, and the whole may be installed, as the case may be, in an industrial plant operated by a programmable controller.

In another variant of the simple filtration assembly, the inlet part leading into the modular ultrasonic reactor is the part 18; in this variant, the liquid to be filtered enters the said reactor 12 through the holes 20 formed in the part 18, then is filtered by the filtering element 14 from the outside towards the inside, before emerging through the part 16.

With reference to FIG. 3, in an example of a tangential filtering assembly, the blocking and connection means 22 have an additional hole allowing double communication of the tubular ultrasonic reactor 12 with the external environment. A first communication takes place via the central hole 24 and puts the inside of the filtering element 14 in communication with the external environment. A second communication takes place by the additional hole 26 and puts the outside of the filtering element 14 in communication.

In this assembly, the liquid to be filtered enters the reactor 12 through the holes formed in the part 28. The arrows shown in FIG. 3 indicate the flow routes of the liquid. The liquid divides into two parts: the first part passes through and is filtered by the filtering element 14 from the outside towards the inside, before emerging from the reactor 12 through the central hole 24 of the part 22, while the second part of the liquid flows tangentially to the filtering element 14 before emerging from the said reactor through the additional hole 26.

Two valves located downstream of the device, one on the circuit of the central hole 24, the other on that of the additional hole, allow the respective flow rates of each circuit to be controlled.

Advantageously, when the present invention is placed within a liquid circuit, it may be subject to periodic counter-current cleaning of the filtering element, preferably triggered automatically, as soon as the pressure difference between the upstream and downstream ends of the said filtering element exceeds a predetermined threshold.

As a consequence of the above, the present invention continuously applies ultrasonic vibration in order to improve the filtration process. Thus it allows a uniform distribution of the ultrasonic power in contact with the filtering surface to be obtained.

A first exemplary use of the assembly, according to that illustrated in FIGS. 1 and 2, has been used satisfactorily in practice.

The tubular ultrasonic reactor is a standard SONITUBE 35 kHz by Sodeva with a length of 225 mm and an internal diameter of 20 mm, placed in a vertical position.

The filtering element 14 used is of Poremet 5 µm absolute type; it has an external diameter of 12 mm and a length of 225 mm.

A 15% by weight suspension of titanium carbide in water, in the form of powder less than 2 µm, is filtered by the invention in order to trap the manufacturing residues and the agglomerates. The suspension is pumped from a stirred reservoir, with a flow rate of 10 liters per minute. It flows through the tubular ultrasonic reactor 12 from the bottom upwards and passes through the filtering element 14 from the inside towards the outside.

Particle size analysis of the suspension shows that the fines content is greater than 99% by mass of the solid phase. However, without ultrasound, the upstream pressure increases rapidly and the liquid stops passing through the filtering element 14 after about 1 minute. The said filtering element is clogged.

With ultrasound, the pressure remains constant at every point of the circuit, the pressure drop within the tubular ultrasound reactor being less than 100 mb. At the end of 12 minutes, that is 120 liters of suspension or 21 kg of carbide powder, the filter has retained 3.6 g of particles but has kept its porosity.

In a second example, the tubular ultrasonic reactor is a standard SONITUBE 20 kHz by Sodeva with a length of 370 mm and an internal diameter of 50 mm, placed in the vertical position and assembled for tangential filtration, valves located downstream of the said filtering element allowing the pressure difference between the upstream and downstream ends of the said filtering element to be varied.

The filtering element used is a Poremet 10 µm filter with a diameter of 40 mm and a length of 30 mm.

A 10% by mass suspension in water of ground silica in the form of a powder having particle sizes between less than 1 µm and 40 µm, is divided up by the invention, by cut-off at 10 µm.

Firstly, the suspension is deagglomerated in the lower part of the tubular ultrasonic reactor not having a filter. A portion of the liquid passes through the filtering element with most of the particles measuring less than 10 microns while a smaller portion of the liquid carries the other particles and remains outside the filtering element before leaving the said reactor. During the operation, it is found that the pressures remain constant until the 50 liters of suspension are exhausted.

A third example uses a tubular ultrasonic reactor 12 of standard SONITUBE 35 kHz type by Sodeva with a length of 225 mm and an internal diameter of 20 mm, placed in the horizontal position, according to one embodiment as illustrated in FIGS. 1 and 2.

The filtering element 14 is a Poremet 2 µm filter, with a diameter of 12 mm and a length of 225 mm.

The process involves filtering a 5% by mass suspension in water of alumina powder intended for polishing. The objective is to remove the particles greater than 2 µm.

The suspension is pumped at a flow rate of 5 liters per minute. The pressure difference between the upstream and downstream ends of the filtering element does not exceed 1 bar after 20 min, in spite of the formation of a layer of residue of about 3 mm around the filtering element.

A simple counter-current operation without ultrasound enables the residue to be recovered while regenerating the filtering element by removing all the particles trapped in the pores of the said filtering element.

What is claimed is:

1. Continuous filtration device in a liquid path, comprising:
    a modular ultrasonic treatment unit (12) which is in the form of a tubular metal body (11) with a cylindrical internal surface (13) and of circular cross section, open at both its feed end (10) and its discharge end (15), the external surface of said tubular metal body having, in the vicinity of a nodal zone, a collar (17) which is coaxial with said tube and which projects radially, this collar being equipped at its periphery with an ultrasonic converter (19) which projects radially and whose frequency is equal to the vibration frequency of said collar (17) and to the longitudinal vibration frequency of said tubular metal body (11), and
    a filtering cylindrical element (14) having a minimum filtration area of about 50 cm$^2$ with a mesh opening less than about 20 µm, which is arranged inside the tubular metal body (11) and coaxially with the latter between its feed end (10) and discharge end (15),
    the nominal ultrasonic power density dissipated inside the tubular metal body being greater than about 2 watts per cm$^2$ of filtering area.

2. Device according to claim 1, wherein the length of the tubular metal body (11) is equal to a whole number of half wavelengths of the ultrasonic vibration frequency delivered by the converter, the internal and external diameters of the collar (17) being determined so that the vibration frequency of said collar is at the same ultrasonic vibration frequency as that delivered by the converter (19).

3. Device according to claim 1, wherein the filtering cylindrical element (14) is chosen from woven or nonwoven metal filters mounted on a metal support, woven or nonwoven synthetic filters mounted on a metal support, sintered multilayer metal filters and self-supporting sintered metal or mineral filters.

4. Device according to claim 1, wherein the filtering cylindrical element (14) is connected to the tubular metal body by connecting parts designed such that the liquid to be filtered passes from the outside of the filtering element towards the inside thereof.

5. Device according to claim 1, wherein the filtering cylindrical element (14) is connected to the tubular metal body by connecting parts designed such that the liquid to the filtered passes from the inside of the filtering element towards the outside thereof.

6. Device according to claim 1, wherein the device is integrated into a circuit carrying a liquid to be filtered, making it possible to measure the pressure difference between the inlet and the outlet of the device and to control this pressure difference by adjusting the flow rate of liquid in the circuit and/or the pressure drop downstream of the said device.

7. Device according to claim 1, wherein the connecting parts between the tubular metal body and the filtering cylindrical element together with the circuit carrying the fluid to be treated are designed such that the filtration is carried out according to a tangential filtration principle.

8. Device according to claim 1, wherein the device is integrated into a circuit carrying a liquid to be filtered, making it possible to carry out periodic counter-current cleaning of the filtering element, as soon as the pressure difference between the inlet and the outlet of the said filtering element exceeds a predetermined threshold value.

9. Device according to claim 1 wherein the minimum filtration area is about 80 cm$^2$.

10. Ultrasonic filter, made by coupling, in series or in parallel, a plurality of modular ultrasonic treatment units according to claim 1, containing a filtering cylindrical element so as to create an in-line multi-filter device, said filtering cylindrical element integrated into a circuit carrying a liquid to be filtered, making it possible to carry out periodic counter-current cleaning of the filtering element, as soon as the pressure difference between the inlet and the outlet of the said filtering element exceeds a predetermined threshold value.

11. Ultrasonic filter according to claim 10, wherein the filter comprises several converters powered in parallel by the same generator.

12. Method of using a filtration device according to claim 1, comprising adjusting an intensity of cavitation in the liquid to be filtered by controlling the power of the ultrasonic vibration and/or by the choice of the shape of a booster interposed between the ultrasonic transducer and the external surface of said collar.

* * * * *

UNITED STATES PATENT AND TRADEMARK OFFICE
CERTIFICATE OF CORRECTION

PATENT NO. : 7,101,485 B2 Page 1 of 1
APPLICATION NO. : 10/472024
DATED : September 5, 2006
INVENTOR(S) : Dubruque et al.

It is certified that error appears in the above-identified patent and that said Letters Patent is hereby corrected as shown below:

Col. 8, Line 12, please delete "the choice of" and insert -- choosing --.

Signed and Sealed this

Twenty-seventh Day of November, 2007

JON W. DUDAS
*Director of the United States Patent and Trademark Office*